United States Patent
Umesh et al.

(10) Patent No.: US 8,144,651 B2
(45) Date of Patent: Mar. 27, 2012

(54) MOBILE COMMUNICATION SYSTEM AND MOBILE STATION

(75) Inventors: Anil Umesh, Yokohama (JP); Minami Ishii, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 69 days.

(21) Appl. No.: 12/673,380

(22) PCT Filed: Aug. 15, 2008

(86) PCT No.: PCT/JP2008/064656
§ 371 (c)(1),
(2), (4) Date: Jun. 2, 2010

(87) PCT Pub. No.: WO2009/022744
PCT Pub. Date: Feb. 19, 2009

(65) Prior Publication Data
US 2011/0199984 A1    Aug. 18, 2011

(30) Foreign Application Priority Data
Aug. 15, 2007   (JP) ................................ 2007-211993

(51) Int. Cl.
*H04W 4/00* (2009.01)

(52) U.S. Cl. ...................... 370/328; 455/422.1; 370/338

(58) Field of Classification Search .......................... None
See application file for complete search history.

(56) References Cited

U.S. PATENT DOCUMENTS

| 7,916,675 B2 * | 3/2011 | Dalsgaard et al. | 370/311 |
| 7,969,964 B2 * | 6/2011 | Kim et al. | 370/350 |
| 2007/0286080 A1 * | 12/2007 | Kim et al. | 370/236 |
| 2008/0167089 A1 * | 7/2008 | Suzuki et al. | 455/574 |
| 2008/0192703 A1 * | 8/2008 | Suzuki | 370/335 |
| 2008/0232310 A1 * | 9/2008 | Xu | 370/329 |

FOREIGN PATENT DOCUMENTS

| JP | 2006-135929 A | 5/2006 |
| JP | 2006-352708 A | 12/2006 |
| WO | 2006/135019 A1 | 12/2006 |

OTHER PUBLICATIONS

3GPP TS 36.300 V8.1.0, Jun. 2007, Evolved Universal Terrestrial Radio Access (E-UTRA) and Evolved Universal Terrestrial Radio Access Network (E-UTRAN), 106 pages.
International Search Report issued in PCT/JP2008/064656, mailed on Nov. 18, 2008, with translation, 3 pages.
Written Opinion issued in PCT/JP2008/064656, mailed on Nov. 18, 2008, 5 pages.
Extended European Search Report for Application No. 08792502.0 mailed Sep. 16, 2011 (7 pages).

* cited by examiner

*Primary Examiner* — Bob Phunkulh
(74) *Attorney, Agent, or Firm* — Osha Liang LLP

(57) ABSTRACT

When a radio resource allocation channel transmitted from a radio base station (eNB) at a discontinuous reception timing satisfies a specific condition, a mobile station (UE) is configured not to start a continuous reception of a signal transmitted from the radio base station (eNB), but to continue the discontinuous reception of a signal transmitted from the radio base station (eNB), even though the mobile station (UE) is performing the discontinuous reception of a signal transmitted from the radio base station (eNB).

12 Claims, 9 Drawing Sheets

MOBILE COMMUNICATION SYSTEM AND MOBILE STATION

TECHNICAL FIELD

The present invention relates to a mobile communication system and a mobile station.

BACKGROUND ART

In the LTE (Long Term Evolution), a state in which communications via a radio link can be performed between a radio base station eNB and a mobile station UE is referred to as an "RRC_CONNECTED state".

Note that a state which is not the "RRC_CONNECTED state" is referred to as an "RRC_IDLE state". In the "RRC_IDLE state", the radio base station eNB is not aware of the presence of the mobile station UE, and therefore communications via a radio link cannot be performed between the radio base station eNB and the mobile station UE.

In the LTE, in order to reduce power consumption of the mobile station UE, the mobile station UE in the "RRC_CONNECTED state" is capable of performing discontinuous reception (DRX) of signals transmitted from the radio base station eNB.

Figure 1A:
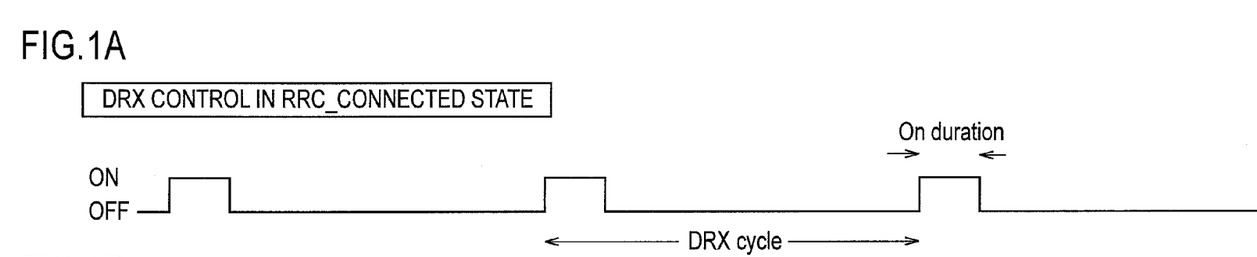
FIG. 1 is a diagram for explaining a conventional mobile communication system.
Figure 1B:
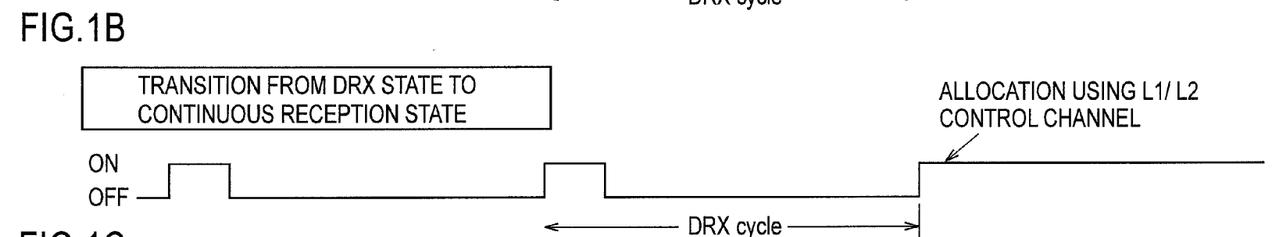
Figure 1C:
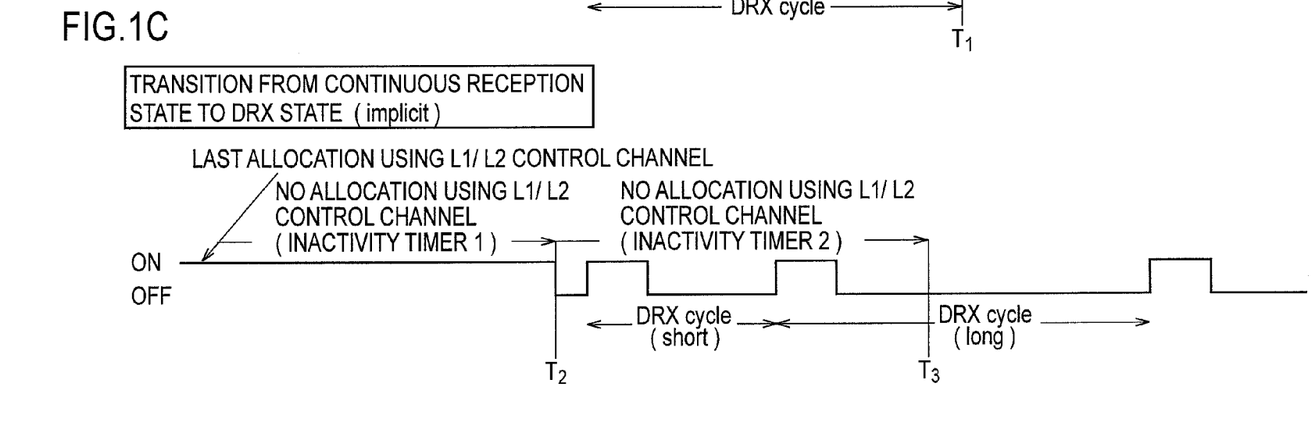

FIG. 1 (a) to FIG. 1 (c) show DRX control performed in the "RRC_CONNECTED state", on which an agreement has been made in the LTE.

The discontinuous reception is characterized by a "DRX cycle" and an "On duration length (discontinuous reception timing duration)".

The mobile station UE is configured to receive a signal, transmitted from the radio base station eNB, only during the "On duration (discontinuous reception timing)" occurring once in a "DRX cycle".

Since no signal is transmitted from the radio base station eNB in a time period other than the "On duration", the mobile station UE turns off a processor, a DSP, a chip, and the like which are used for radio signal reception processing, thereby achieving reduction in power consumption.

Note that the radio base station eNB is configured to notify the mobile station UE of the "DRX cycle" and the "On duration length".

Conceivable examples of a timing at which the radio base station eNB notifies the mobile station UE of the "DRX cycle" and the "On duration length" include a timing at which the "RRC_IDLE state" transitions to the "RRC_CONNECTED state", a timing at which a new radio bearer is set up, a timing at which a radio bearer is released, a handover timing, and the like.

In addition, when detecting radio resource allocation through a radio resource allocation channel (L1/L2 control channel) from the radio base station eNB, in the "On duration" during the discontinuous reception as shown in FIG. 1 (b), the mobile station UE is configured to start continuous reception of signals transmitted from the radio base station eNB.

Specifically, when detecting a mobile station identifier allocated to the mobile station UE as a result of decoding of the L1/L2 control channel, the mobile station UE performing the discontinuous reception is configured to start the continuous reception of signals transmitted from the radio base station eNB (T1 in FIG. 1 (b)).

On the other hand, when not detecting the radio resource allocation through the L1/L2 control channel from the radio base station eNB within a certain continuous period (that is, a period until an inactivity timer (inactive timer) 1 expires) during the continuous reception as shown in FIG. 1 (c), the mobile station UE is configured to start discontinuous reception of signals transmitted from the radio base station eNB (T2 in FIG. 1 (c)).

In the LTE, at least two types of DRX cycles can be set as a DRX cycle in discontinuous reception.

In this respect, the mobile station UE is configured to change the DRX cycle from a DRX cycle on a first phase (DRX cycle (short)) to a longer DRX cycle on a second phase (DRX cycle (long)) when not detecting the radio resource allocation through the L1/L2 control channel from the radio base station eNB within an additional certain continuous period (that is, a period until an inactivity timer 2 expires) (T3 in FIG. 1 (c)).

Note that, the "DRX cycle (short)" and the "DRX cycle (long)" are notified from the radio base station eNB to the mobile station UE.

Here, if one of the DRX cycles ("DRX cycle (short)" or "DRX cycle (long)") is set invalid, for example, the DRX cycle in the discontinuous reception can be set to have only one phase.

In addition, periods managed by the inactivity timers 1 and 2 are also notified from the radio base station eNB to the mobile station UE.

Conceivable examples of a timing at which the radio base station eNB notifies the mobile station UE of the periods managed by the inactivity timers 1 and 2 include a timing at which the "RRC_IDLE state" transitions to the "RRC_CONNECTED state", a timing at which a new radio bearer is set up, a timing at which a radio bearer is released, a handover timing, and the like.

Parameters related to the DRX control in the "RRC_CONNECTED state" in the LTE are listed below.

1. DRX cycle (short) and DRX cycle (long)
2. On duration length
3. Periods managed by inactivity timers 1 and 2

Optimum values of these parameters vary depending on the type of an application for processing data (for example, voice packets, burst traffic data, or the like) transmitted and received between the radio base station eNB and the mobile station UE.

Figure 2:
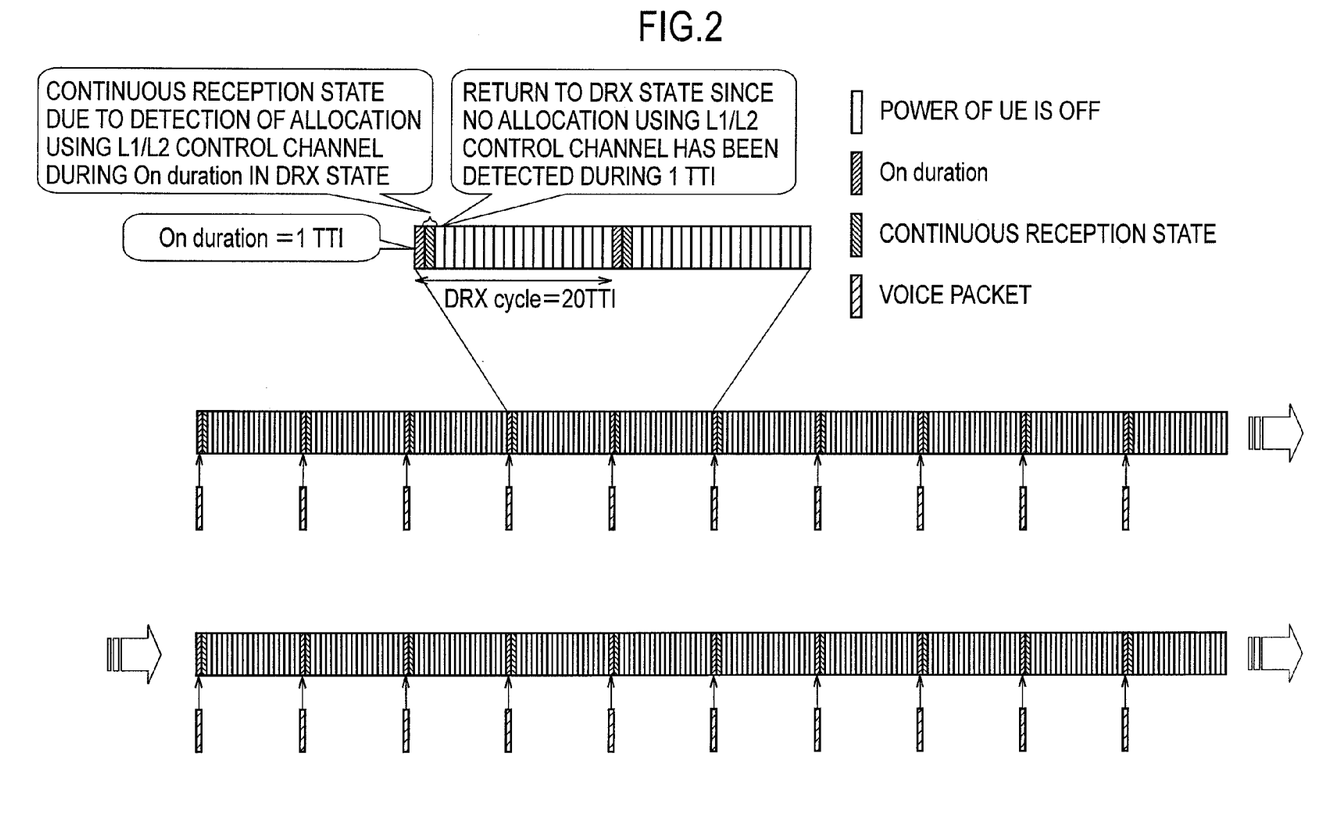
FIG. 2 is a diagram for explaining the conventional mobile communication system.

For example, as shown in FIG. 2, when communications are performed by an application for voice packets, voice packets having small-volume data occur at predetermined intervals.

Here, when communications are performed by the application for voice packets, the voice packets occur every 20 ms. Generally, the voice packets each have data volume which can be transmitted and received within one sub-frame (also referred to as TTI).

In addition, the sub-frame is the minimum time unit at which a radio resource can be allocated, and is 1 ms in the LTE.

Furthermore, in view of the QoS properties required by the application for voice packets, a voice packet transmission delay needs to be suppressed as much as possible. It is therefore general that the radio base station eNB transmits a voice packet to the mobile station UE immediately after an occurrence thereof.

For this reason, in the case of the application for voice packets, it seems optimum to set the parameters related to the DRX control as follows for example.

Figure 3:
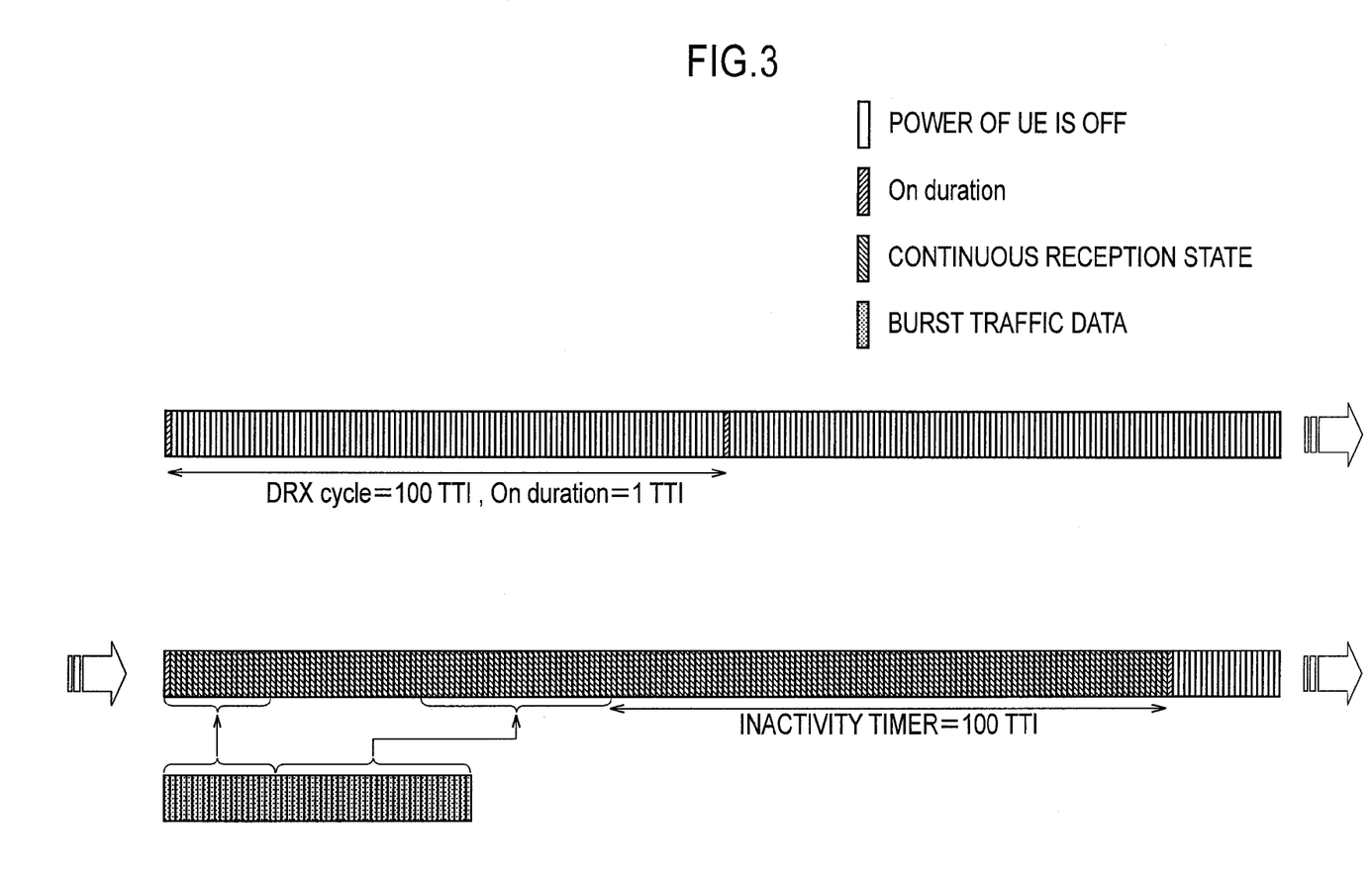
FIG. 3 is a diagram for explaining the conventional mobile communication system.

1. DRX cycle: 20 ms (only "short" is valid)
2. On duration length: one sub-frame
3. Period managed by an inactivity timer 1: one sub-frame Meanwhile, as shown in FIG. 3, there also exist applications for burst traffic data in which traffic data (packets) occur in a burst, such as applications for viewing the Internet, and for transmitting and receiving a file through an FTP.

The applications for burst traffic data have such features that even though a large volume of traffic data occurs when the traffic data occurs, there is a long time period during which no traffic data occurs at all.

In addition, it is often the case that these applications for burst traffic data do not have a very strict requirement for a packet transmission delay. Accordingly, even when burst traffic data occurs, the radio base station eNB does not have to transmit the burst traffic data to the mobile station UE immediately. The radio base station eNB is allowed to transmit the burst traffic data by selecting, for example, time when a radio link between the radio base station eNB and the mobile station UE has a good quality.

Accordingly, for these applications for burst traffic data, when burst traffic data exists in the radio base station eNB, it is desirable that the mobile station UE perform continuous reception as continuously as possible. It thus seems optimum to set the parameters related to the DRX control as follows, for example.

1. DRX cycle: several hundred ms (short), and a value in the order of seconds (long)
2. On duration length: several sub-frames
3. Periods managed by inactivity timers: several hundred ms (1), and several seconds to several ten seconds (2)

Non-Patent Document 1: 3GPP TS36.300 V8.1.0, June 2007

As learned from the above-described example, the optimum values of the parameters related to the DRX control vary considerably depending on the type of an application for processing data transmitted and received between the radio base station eNB and the mobile station UE.

Accordingly, the DRX control on which an agreement is made in the LTE has a problem that optimum DRX control cannot be performed in a case where, for example, both types of data of an application for voice packets and an application for burst traffic data are concurrently transmitted or received between the radio base station eNB and the mobile station UE.

In such a case, if the parameters related to the DRX control are set to values optimized, for example, for the application for voice packets, data for the other application in which burst traffic data occurs cannot be handled optimally.

Figure 4:
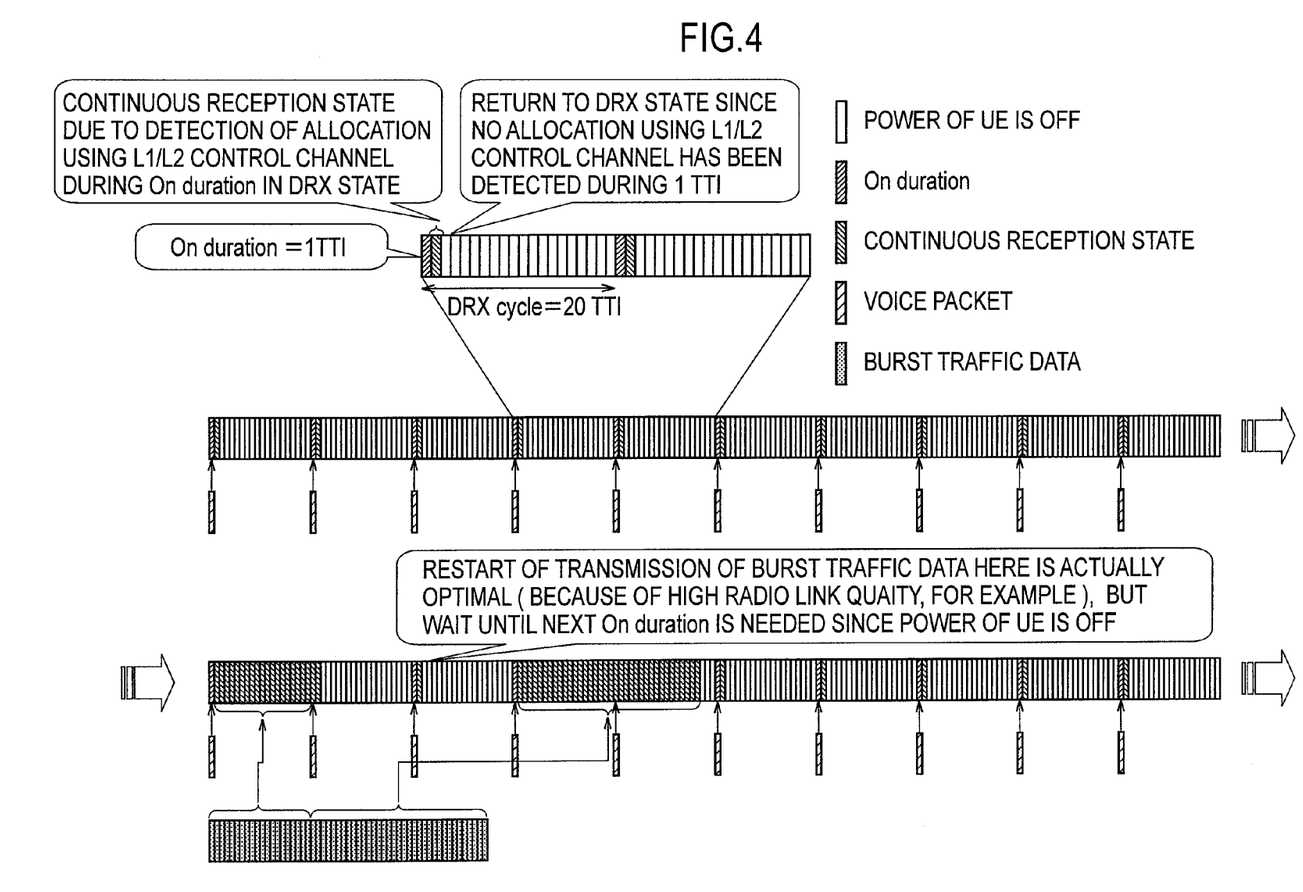
FIG. 4 is a diagram for explaining the conventional mobile communication system.

Specifically, as shown in FIG. 4, since the period managed by the inactivity timer and optimized for the application for voice packets is too short, the mobile station UE starts discontinuous reception if the radio base station eNB stops, even for an instant, transmitting data to the mobile station UE performing continuous reception. This eliminates the flexibility in timing at which the burst traffic data can be transmitted to the mobile station UE, thus preventing optimum radio resource utilization.

On the other hand, if the period managed by the inactivity timer is set longer, the mobile station UE transitions to a continuous reception state every time an L1/L2 control channel is used for voice packet transmission, and then returns to a discontinuous reception state (DRX state) at a much later timing. Thus, power consumption of the mobile station UE cannot be fully reduced.

Meanwhile, it has been determined that the LTE supports a radio resource allocation method referred to as "persistent scheduling (static allocation scheduling)" or "semi-persistent scheduling)" so as to transmit voice packets efficiently.

By contrast, a radio resource allocation method normally employed in the LTE is referred to as "dynamic scheduling (dynamic allocation scheduling)".

When allocating a downlink radio resource to the mobile station UE by using the dynamic scheduling, the radio base station eNB transmits a radio resource allocation channel (L1/L2 control channel) to the mobile station UE. The L1/L2 control channel is terminated at the physical layer and MAC layer of each of the radio base station eNB and the mobile station UE. Meanwhile, the mobile station UE receives the L1/L2 control channel, thereby recognizes that the radio resource is allocated to the mobile station UE, and decodes data transmitted by using the radio resource allocated to the mobile station UE, in accordance with information included in the received L1/L2 control channel.

Specifically, the mobile station UE is configured to attempt to perform decoding processing on the L1/L2 control channel during the "On duration" when performing discontinuous reception, and configured to attempt to perform decoding processing on the L1/L2 control channel every sub-frame when performing continuous reception.

The L1/L2 control channel for notifying downlink radio resource allocation using the dynamic scheduling includes information such as data block size (TB size), a modulation method (modulation), an allocated physical resource (PRB) and HARQ-related information. Based on these kinds of information, a CRC bit sequence is calculated.

For the mobile station UE targeted for radio resource allocation, the calculated CRC bit sequence is further subjected to a predetermined operation (masking) using a mobile station identifier previously and uniquely allocated to the mobile station UE, and then added to an information bit sequence of the L1/L2 control channel.

Subsequently, the information bit sequence of the L1/L2 control channel including the CRC bit sequence is subjected to error correction coding processing, and then transmitted as a radio signal to the mobile station UE.

The mobile station UE is configured to receive a physical resource through which the L1/L2 control channel is transmitted, to perform error correction decoding processing thereon, and then to perform a predetermined operation (unmasking) on the CRC bit sequence by using the mobile station identifier allocated by the radio base station eNB beforehand.

Then, based on a CRC determination result based on the CRC bit sequence resulting from the predetermined operation, the mobile station UE is configured to determine whether or not the L1/L2 control channel has been properly decoded.

Here, in a case where the L1/L2 control channel transmitted to a different mobile station UE from the radio base station eNB is transmitted to the mobile station UE, there is a mismatch between mobile station identifiers, one of which is used in the predetermined operation (unmasking) on the CRC bit sequence by the mobile station UE after the error correction decoding, and the other of which is used in the predetermined operation (masking) on the CRC bit sequence by the radio base station eNB before the error correction decoding. Accordingly, the mobile station UE can determine that the L1/L2 control channel has not been decoded properly on the basis of the CRC determination result based on the unmasked CRC bit sequence.

This means that, when determining that the L1/L2 control channel notifying the mobile station UE of the downlink radio resource allocation has been decoded properly on the basis of the CRC determination result, the mobile station UE concurrently detects that the downlink radio resource is allocated to the mobile station UE.

Figure 5:
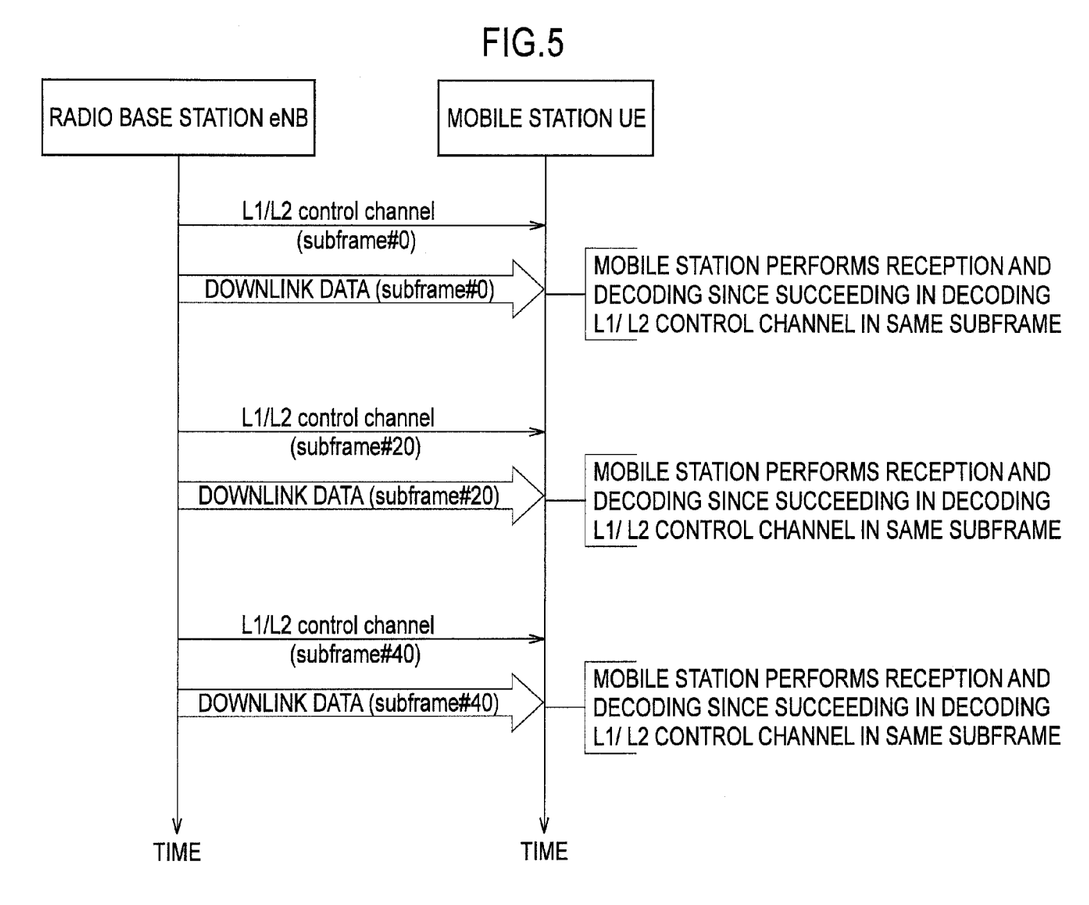
FIG. 5 is a diagram for explaining the conventional mobile communication system.

A downlink radio resource allocated by using the dynamic scheduling is valid only within one sub-frame. In order to allocate a downlink radio resource to a specific mobile station UE over different sub-frames, an L1/L2 control channel for downlink radio resource allocation needs to be transmitted to the mobile station UE every sub-frame, as shown in FIG. 5.

In sum, since a downlink radio resource to be allocated can be changed sub-frame by sub-frame by using the dynamic scheduling, optimum radio resource allocation can be performed according to the ever-changing quality and data volume of a radio link.

Meanwhile, there is a problem of increasing overhead of a downlink radio resource, if the dynamic scheduling is employed for an application, such as an application for voice packets, in which packets each having certain small-volume data occur regularly. This is because the L1/L2 control channel itself consumes a downlink radio resource.

In this respect, in order to support such an application for voice packets efficiently, the above-described radio resource allocation method using the persistent scheduling has been studied and determined to be supported in the LTE.

When allocating a downlink radio resource to the mobile station UE by using the persistent scheduling, the radio base station eNB notifies, to the mobile station UE, information such as data block size (TB size), a modulation method (modulation), an allocated physical resource (PRB) and HARQ-related information. For the notification, the radio base station uses either a radio resource allocation channel (L1/L2 control channel) terminated at the physical layer and MAC layer of each of the radio base station eNB and the mobile station UE, or an RRC message terminated at the RRC layer of each of the radio base station eNB and the mobile station UE.

Here, a value of each of these kinds of notified information is not limited to a single value, but plural candidate values may be notified as appropriate.

The mobile station UE is configured to perform decoding of the downlink radio resource in a certain sub-frame in accordance with these kinds of information even without receiving the radio resource allocation through the L1/L2 control channel.

Figure 6:
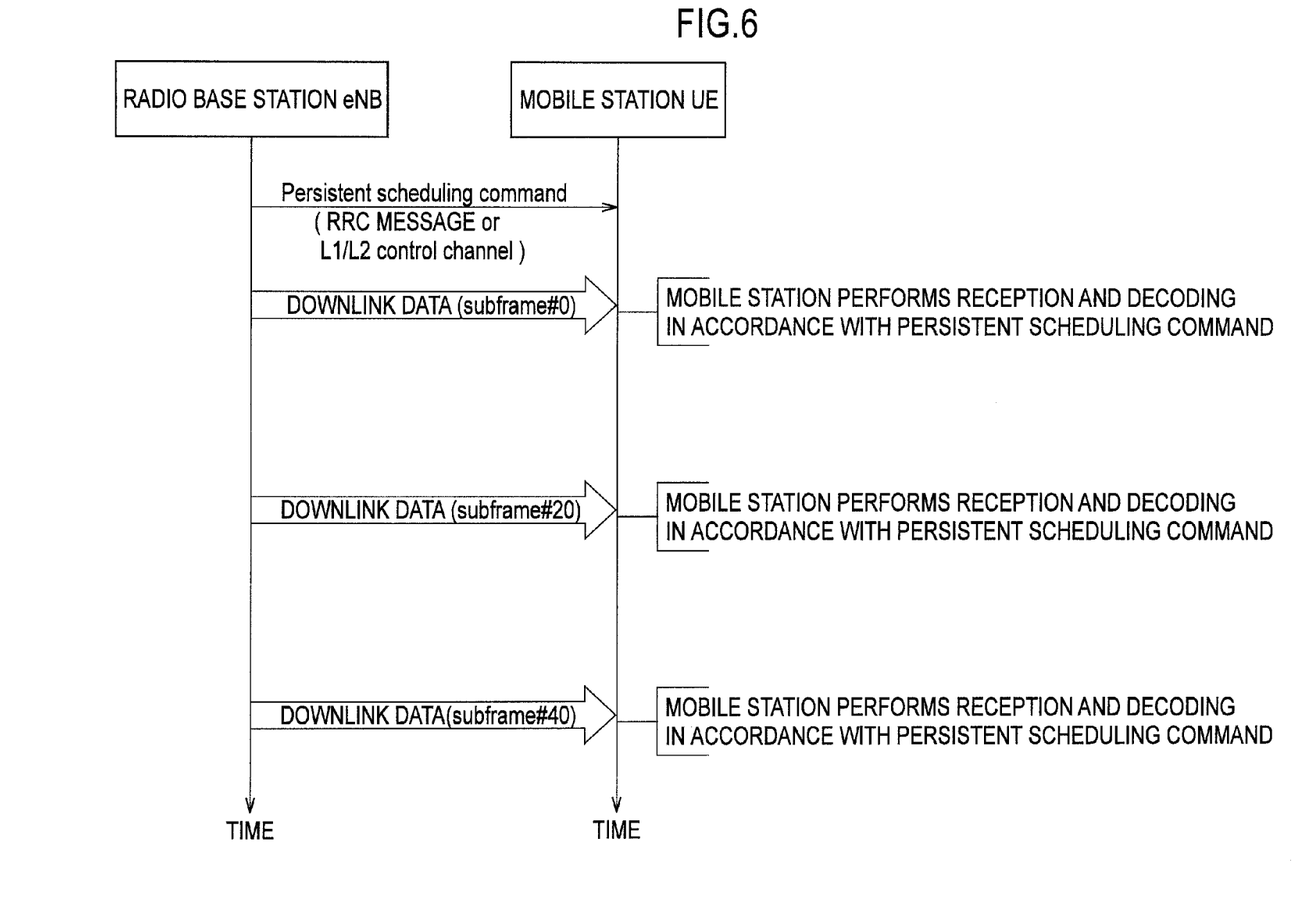
FIG. 6 is a diagram for explaining the conventional mobile communication system.

As shown in FIG. 6, the radio resource allocation by the persistent scheduling is valid until a new persistent scheduling command or a command for stopping the persistent scheduling occurs.

Here, when the radio base station eNB uses an L1/L2 control channel to notify, to the mobile station UE, a downlink radio resource allocated by the persistent scheduling, the mobile station UE needs to discriminate between the L1/L2 control channel used for notifying the downlink radio resource allocated by the persistent scheduling and an L1/L2 control channel used for notifying a downlink radio resource allocated by the dynamic scheduling.

In addition, it has been determined, in the LTE, that, even though downlink radio resource allocation by the persistent scheduling is employed, a downlink radio resource to be used for retransmission under HARQ control should be notified by using an L1/L2 control channel every time retransmission under HARQ control is performed.

In this case, the mobile station UE also needs to discriminate between the L1/L2 control channel for notifying the downlink radio resource to be used for the retransmission under HARQ control in the persistent scheduling and an L1/L2 control channel used for notifying a downlink radio resource allocated by the dynamic scheduling.

As described above, the existing LTE has a problem that, when both types of data of an application for voice packets and an application for burst traffic data are transmitted or received between the radio base station eNB and the mobile station UE, it is difficult to optimize the parameters related to the DRX control in the "RRC_CONNECTED state".

DISCLOSURE OF THE INVENTION

The present invention has been made in view of the aforementioned problems. An object thereof is to provide a mobile communication system and a mobile station which are capable of DRX control in "RRC_CONNECTED state" achieving optimization of parameters related to DRX control, maintaining scheduler's flexibility to burst traffic data while maximizing reduction in power consumption of a mobile station UE, and thus effectively utilizing radio resources, even though both types of data of an application for voice packets and an application for burst traffic data are transmitted and received between a radio base station eNB and the mobile station UE.

A first aspect of the present invention is summarized as a mobile communication system configured to allow a mobile station to start continuous reception of a signal transmitted from a radio base station when the mobile station performing discontinuous reception of a signal transmitted from the radio base station detects that a mobile station identifier allocated to the mobile station is included in a radio resource allocation channel transmitted from the radio base station at a discontinuous reception timing, wherein when the radio resource allocation channel transmitted from the radio base station at the discontinuous reception timing satisfies a specific condition, the mobile station is configured not to start the continuous reception of a signal transmitted from the radio base station, but to continue the discontinuous reception of a signal transmitted from the radio base station, even though the mobile station is performing the discontinuous reception of a signal transmitted from the radio base station.

A second aspect of the present invention is summarized as a mobile communication system configured to allow a mobile station to reactivate a predetermined timer when the mobile station performing continuous reception of a signal transmitted from a radio base station detects that a mobile station identifier allocated to the mobile station is included in a radio resource allocation channel transmitted from the radio base station, before the predetermined timer expires, and to start discontinuous reception of a signal transmitted from the radio base station when the predetermined timer expires, wherein, when the radio resource allocation channel transmitted from the radio base station satisfies a specific condition, the mobile station is configured not to reactivate the predetermined timer, even though the mobile station detects that the mobile station identifier allocated to the mobile station is included in the radio resource allocation channel transmitted from the radio base station, before the predetermined timer expires.

A third aspect of the present invention is summarized as a mobile station used in a mobile communication system configured to allow the mobile station to start continuous reception of a signal transmitted from a radio base station when the mobile station performing discontinuous reception of a signal transmitted from the radio base station detects that a mobile station identifier allocated to the mobile station is included in a radio resource allocation channel transmitted from the radio base station at a discontinuous reception timing, wherein, when the radio resource allocation channel transmitted from the radio base station at the discontinuous reception timing satisfies a specific condition, the mobile station is configured not to start the continuous reception of a signal transmitted from the radio base station, but to continue the discontinuous reception of a signal transmitted from the radio base station, even though the mobile station is performing the discontinuous reception of a signal transmitted from the radio base station.

A fourth aspect of the present invention is summarized as a mobile station used in a mobile communication system configured to allow the mobile station to reactivate a predetermined timer when the mobile station performing continuous reception of a signal transmitted from a radio base station detects that a mobile station identifier allocated to the mobile station is included in a radio resource allocation channel transmitted from the radio base station, before the predetermined timer expires, and to start discontinuous reception of a signal transmitted from the radio base station when the predetermined timer expires, wherein, when the radio resource allocation channel transmitted from the radio base station satisfies a specific condition, the mobile station is configured not to reactivate the predetermined timer, even though the mobile station detects that the mobile station identifier allocated to the mobile station is included in the radio resource allocation channel transmitted from the radio base station, before the predetermined timer expires.

As described above, according to the present invention, it is possible to provide the mobile communication system and the mobile station which are capable of, in the DRX control in the "RRC_CONNECTED state", achieving optimization of parameters related to the DRX control, maintaining scheduler's flexibility to burst traffic data while maximizing reduction in power consumption of the mobile station UE, and thus effectively utilizing radio resources, even though both types of data of the application for voice packets and the application for burst traffic data are transmitted or received between the radio base station eNB and the mobile station UE.

BEST MODE FOR CARRYING OUT THE INVENTION (Mobile Communication System according to First Embodiment of the Present Invention)

A description is given of a mobile communication system according to a first embodiment of the present invention with reference to FIGS. 7 to 10. Although a mobile communication system of an LTE scheme is described as an example of a mobile communication system in this embodiment, the present invention is applicable to a mobile communication system other than the mobile communication system of the LTE scheme.

Figure 7:
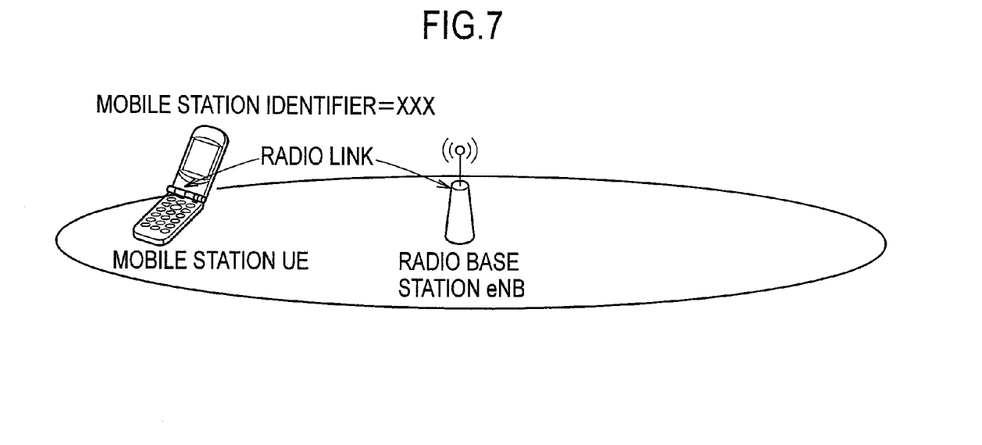
FIG. 7 is an overall configurational diagram of a mobile communication system according to a first embodiment of the present invention.

In the mobile communication system according to this embodiment, as shown in FIG. 7, a radio base station eNB has already allocated a mobile station identifier "xxx" unique to a mobile station, to a mobile station UE existing in a service-provided area, and the radio base station eNB and the mobile station UE are in a state in which communications therebetween via a radio link can be performed at any time ("RRC_CONNECTED state").

Figure 8:
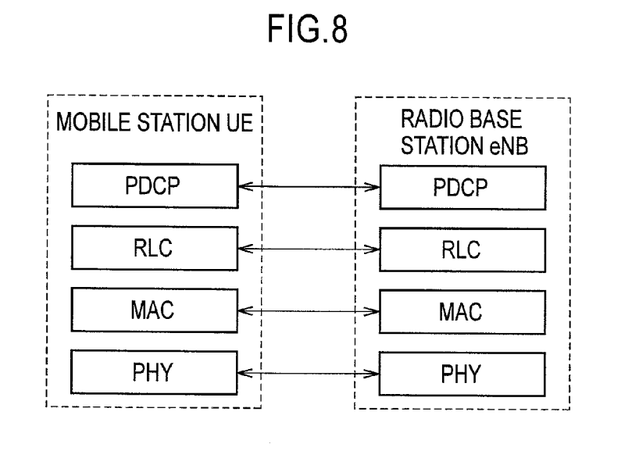
FIG. 8 is a diagram showing a protocol stack in the mobile communication system according to the first embodiment of the present invention.

In addition, as shown in FIG. 8, the radio base station eNB and the mobile station UE have a radio communication protocol stack for data transmission (U-plane) including a physical (PHY) layer, a MAC sub-layer, an RLC sub-layer and a PDCP sub-layer, and thereby communicate with each other.

Figure 9:
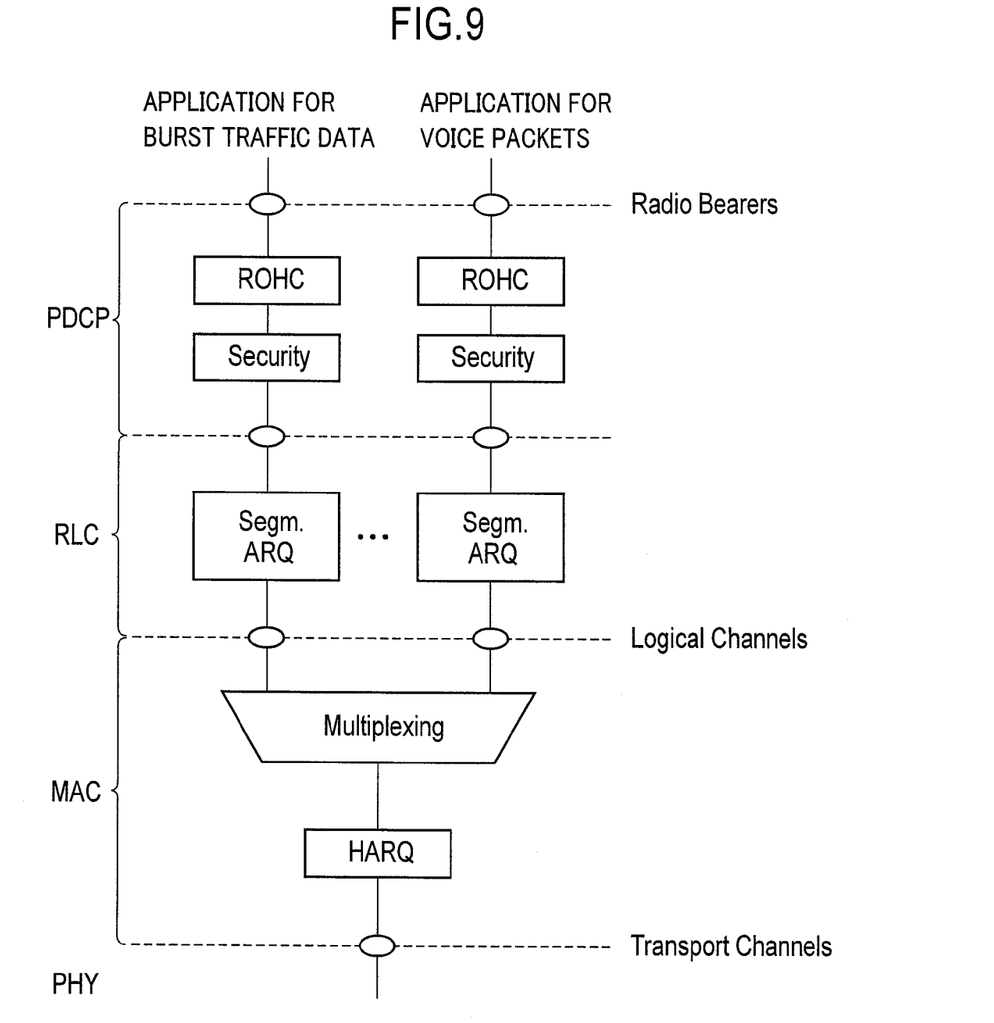
FIG. 9 is a diagram for explaining radio bearers and logical channels which are set by a mobile station according to the first embodiment of the present invention.

Furthermore, as shown in FIG. 9, in the mobile communication system according to this embodiment, plural radio bearers and logical channels can be set for a mobile station. There have been set a radio bearer and a logical channel to which an application for voice packets are mapped, and a radio bearer and a logical channel to which an application for burst traffic data are mapped.

Figure 10:
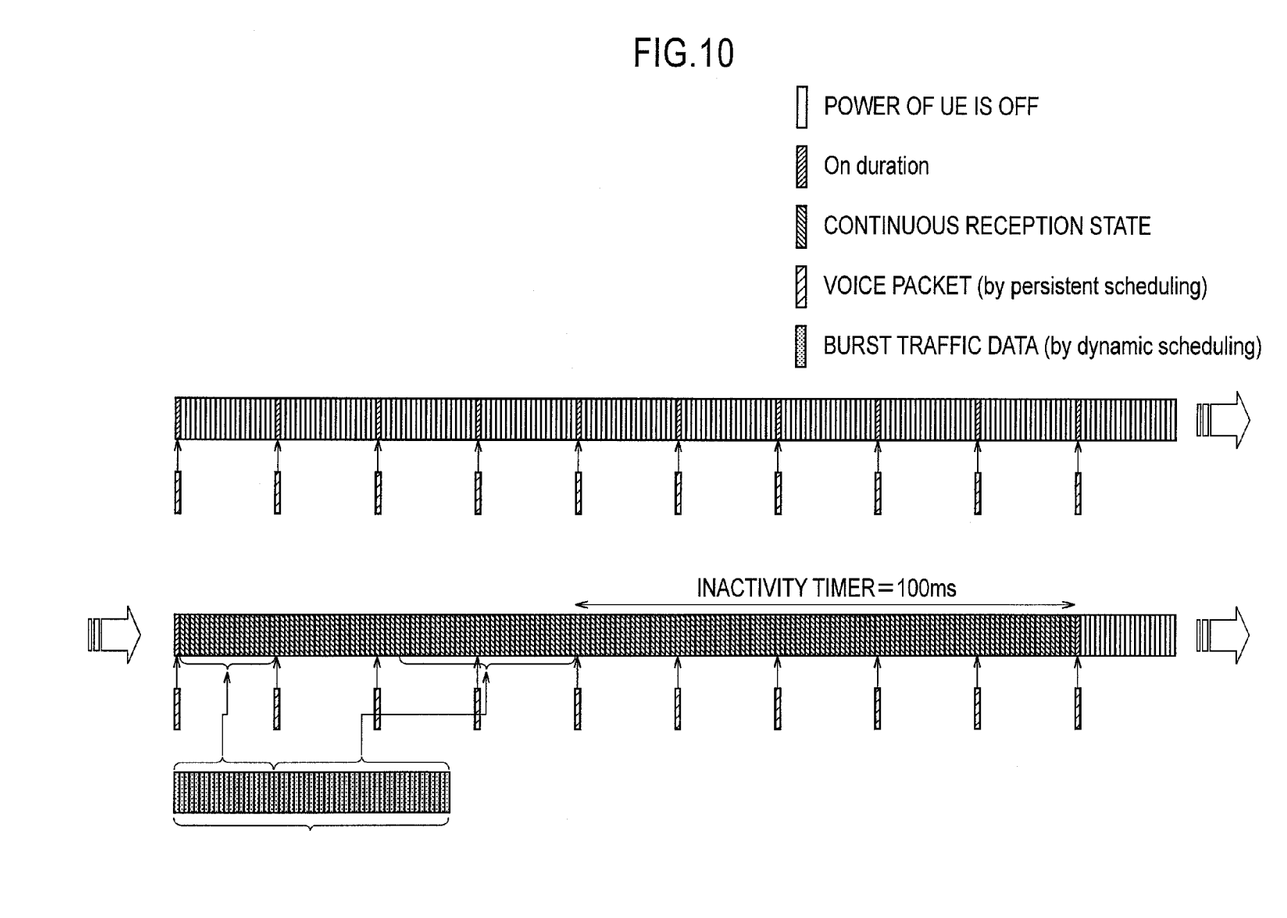
FIG. 10 is a diagram for explaining an effect of the mobile communication system according to the first embodiment of the present invention.

In the mobile communication system according to this embodiment, as shown in FIG. 10, the radio base station eNB is configured to transmit burst traffic data to the mobile station UE by using a radio resource allocated using the dynamic scheduling.

In other words, the radio base station eNB is configured to transmit an L1/L2 control channel to be used for downlink radio resource allocation for the dynamic scheduling (referred to as an L1/L2 control channel—dynamic) to the mobile station UE every time the radio base station eNB transmits burst traffic data.

Meanwhile, as shown in FIG. 10, in the mobile communication system according to this embodiment, the radio base station eNB is configured to transmit voice packets (voice traffic) to the mobile station UE by using a radio resource allocated using the persistent scheduling.

In other words, the radio base station eNB is configured to transmit an L1/L2 control channel to be used for downlink radio resource allocation for the persistent scheduling, to the mobile station UE as appropriate when transmitting voice packets.

Here, the following two types of L1/L2 control channels are assumed as the L1/L2 control channel to be used for the downlink radio resource allocation for the persistent scheduling.

The first L1/L2 control channel is an L1/L2 control channel (referred to as an L1/L2 control channel—persistent initial HARQ transmission) for allocating a radio resource as a downlink radio resource for initial transmission under HARQ control on a certain mobile station UE. The radio resource thus allocated is valid for a longer time than the minimum time unit in which a radio resource can be allocated (one TTI or one sub-frame).

The second L1/L2 control channel is an L1/L2 control channel (referred to as an L1/L2 control channel—persistent HARQ retransmission) for allocating a downlink radio resource for retransmission under HARQ control of downlink data. The downlink data has been transmitted by using the radio resource which has been allocated to the certain mobile station UE and is valid for a longer time than the minimum time unit in which a radio resource can be allocated (one TTI or one sub-frame).

As described above, in the mobile communication system according to this embodiment, the mobile station UE performing discontinuous reception (mobile station in a DRX state) of signals transmitted from the radio base station eNB is configured to start continuous reception of signals transmitted from the radio base station eNB, when detecting that a mobile station identifier "xxx" allocated to the mobile station UE is included in a radio resource allocation channel (L1/L2 control channel) transmitted from the radio base station eNB at a discontinuous reception timing (for example, On duration).

The mobile station UE performing the discontinuous reception of signals transmitted from the radio base station eNB, however, is configured to continue the discontinuous reception of signals transmitted from the radio base station eNB without starting the continuous reception of signals transmitted from the radio base station eNB, in a case where the radio resource allocation channel (L1/L2 control channel) transmitted from the radio base station eNB at the discontinuous reception timing (for example, On duration) satisfies a specific condition.

In addition, in the mobile communication system according to this embodiment, the mobile station UE performing the continuous reception of signals transmitted from the radio base station eNB is configured as follows. When detecting, before an inactivity timer expires, that the mobile station identifier "xxx" allocated to the mobile station UE is included in the radio resource allocation channel (L1/L2 control channel) transmitted from the radio base station eNB, the mobile station UE is configured to reactivate the inactivity timer. When the inactivity timer expires, the mobile station UE is configured to start the discontinuous reception of signals transmitted from the radio base station eNB.

Here, the inactivity timer (predetermined timer) may be configured to be activated, when the mobile station UE cannot detect that the above-described mobile station identifier "xxx" allocated to the mobile station UE is included in the radio resource allocation channel (L1/L2 control channel) transmitted from the radio base station eNB.

Meanwhile, the mobile station UE is configured not to perform stopping and reactivation of the inactivity timer in the following case. The case is that the mobile station UE detects, before the inactivity timer expires, that the mobile station identifier "xxx" allocated to the mobile station UE is included in the radio resource allocation channel (L1/L2 control channel) transmitted from the radio base station eNB, but the radio resource allocation channel transmitted from the radio base station eNB satisfies the specific condition.

Here, the aforementioned specific condition is satisfied, in a case where a radio resource valid for a longer time than the minimum time unit in which a radio resource can be allocated (one TTI or one sub-frame) is allocated as a downlink radio resource for the mobile station UE, by using the radio resource allocation channel (L1/L2 control channel) transmitted from the radio base station eNB, that is, in a case where the radio resource allocation channel (L1/L2 control channel) is an L1/L2 control channel used for downlink radio resource allocation for the persistent scheduling.

Note that, in the mobile communication system according to this embodiment, the HARQ control is performed between the radio base station eNB and the mobile station UE. Thus, the following two cases are assumed as concrete examples satisfying the specific condition.

Firstly, it is determined that the aforementioned specific condition is satisfied, in a case where a radio resource allocation channel (L1/L2 control channel) transmitted from the radio base station eNB is a channel for allocating a radio resource valid for a longer time than the minimum time unit in which a radio resource can be allocated (one TTI or one sub-frame), as a downlink radio resource for initial transmission under HARQ control on the mobile station UE, that is, in a case where the channel is the "L1/L2 control channel— persistent initial HARQ transmission".

Secondly, it is determined that the aforementioned specific condition is satisfied, in a case where the radio resource allocation channel (L1/L2 control channel) transmitted from the radio base station eNB is the "L1/L2 control channel— persistent HARQ retransmission"."

Hereinbelow, a description is given of the "L1/L2 control channel—persistent HARQ retransmission".

Firstly, the radio base station eNB performing the HARQ control with the mobile station UE is configured to allocate a radio resource to the mobile station UE as a downlink radio resource for the mobile station UE, by using a radio resource allocation channel ("L1/L2 control channel—persistent initial HARQ transmission"), the radio resource being valid for a longer time than the minimum time unit in which a radio resource can be allocated (one TTI or one sub-frame). Then, the radio base station eNB is configured to transmit downlink data by using the downlink radio resource.

Next, the radio base station eNB is configured to allocate, to the mobile station UE, a downlink radio resource for retransmission under the HARQ control of the downlink data having been transmitted by using the radio resource which has been allocated to the mobile station UE and valid for a longer time than the minimum time unit in which a radio resource can be allocated (one TTI or one sub-frame). Then, the radio base station eNB is configured to retransmit the downlink data by using the downlink radio resource.

Specifically, in the mobile communication system according to this embodiment, voice packets are transmitted and received by using the radio resource allocated by using the persistent scheduling. Thereby, even though voice packets (or packets including a voice packet) are transmitted and received at a discontinuous reception timing (for example, the "On duration"), the mobile station UE does not start continuous reception of signals (voice packets) transmitted from the radio base station eNB.

In addition, in the mobile communication system according to this embodiment, even though voice packets (or packets including a voice packet) are transmitted and received at a continuous reception timing, stopping and reactivation of the inactivity timer is not performed. Accordingly, a relatively long duration value optimized for transmission and reception of burst traffic data can be set in the inactivity timer.

Incidentally, in order for the mobile station UE to discriminate between the aforementioned L1/L2 control channels, a bit may be set in the L1/L2 control channels as an information element, the bit indicating, for example, whether the L1/L2 control channel is for the persistent scheduling or the dynamic scheduling.

Alternatively, in order for the mobile station UE to discriminate between the aforementioned L1/L2 control channels, the mobile communication system may be configured as follows. When a predetermined value is set as the information element (for example, TB size, HARQ-related information, or the like) of an L1/L2 control channel, this means that the L1/L2 control channel is for the persistent scheduling, and other cases show that the L1/L2 control channel is for the dynamic scheduling.

Still alternatively, in order for the mobile station UE to discriminate between the aforementioned L1/L2 control channels, the mobile communication system may be configured to change the physical resource used for transmitting the L1/L2 control channel.

Still alternatively, in order for the mobile station UE to discriminate between the aforementioned L1/L2 control channels, the mobile communication system may be configured to change the information data volume included in the L1/L2 control channel.

As described above, the mobile communication system according to this embodiment enables maximum reduction in power consumption of the mobile station UE, by optimizing the DRX cycle for transmission and reception of voice packets, as shown in FIG. 10, in a state where only voice packets occur.

In addition, with the mobile communication system according to this embodiment, when burst traffic data occur, radio resource allocation using the dynamic scheduling is performed by using an L1/L2 control channel. Accordingly, the mobile station UE starts continuous reception, and an enough time can be set for the inactivity timer in consideration of the burst traffic data. Thus, the maximum flexibility of the scheduler can be secured until occurrences of the burst traffic data settle down and the utilization efficiency of radio resources can be improved.

The above described aspects of this embodiment may be expressed as follows.

A first aspect of the present embodiment is summarized as a mobile communication system configured to allow a mobile station UE to start continuous reception of a signal transmitted from a radio base station eNB when the mobile station UE performing discontinuous reception of a signal transmitted from the radio base station eNB detects that a mobile station identifier "xxx" allocated to the mobile station UE is included in a radio resource allocation channel (L1/L2 control channel) transmitted from the radio base station eNB at a discontinuous reception timing, wherein, when the radio resource allocation channel (L1/L2 control channel) transmitted from the radio base station eNB at the discontinuous reception timing (for example, the "On duration") satisfies a specific condition, the mobile station UE is configured not to start the continuous reception of a signal transmitted from the radio base station eNB, but to continue the discontinuous reception of a signal transmitted from the radio base station eNB, even though the mobile station UE is performing the discontinuous reception of a signal transmitted from the radio base station eNB.

In the first aspect, the radio resource allocation channel (L1/L2 control channel) transmitted from the radio base station eNB at the discontinuous reception timing can be determined to satisfy the specific condition, when the radio resource allocation channel (L1/L2 control channel) is allocating a radio resource valid for a longer time than a minimum time unit (one sub-frame) in which a radio resource can be allocated, as a downlink radio resource for the mobile station UE.

In the first aspect, HARQ control can be performed between the radio base station eNB and the mobile station UE; the radio base station eNB can be configured to allocate a downlink radio resource to the mobile station UE by using the radio resource allocation channel (L1/L2 control channel), and to transmit downlink data by using the downlink radio resource; and the radio resource allocation channel (L1/L2 control channel) transmitted from the radio base station eNB can be determined to satisfy the specific condition, when the radio resource allocation channel (L1/L2 control channel) is allocating a downlink radio resource for retransmitting the downlink data to the mobile station UE under the HARQ control.

In the first aspect, the radio base station eNB can be configured to allocate a radio resource valid for a longer time than a minimum time unit (one sub-frame) in which a radio resource can be allocated, as a downlink radio resource for the mobile station UE by using the radio resource allocation channel (L1/L2 control channel), and to transmit downlink data by using the downlink radio resource; and the radio resource allocation channel (L1/L2 control channel) transmitted from the radio base station eNB at the discontinuous reception timing (for example, the "On duration") can be determined to satisfy the specific condition, when the radio resource allocation channel (L1/L2 control channel) is a channel (L1/L2 control channel—persistent HARQ retransmission) for allocating a downlink radio resource for retransmitting the downlink data to the mobile station UE under the HARQ control.

A second aspect of the present embodiment is summarized as a mobile communication system configured to allow a mobile station UE to reactivate a predetermined timer (inactivity timer) when the mobile station UE performing continuous reception of a signal transmitted from a radio base station eNB detects that a mobile station identifier "xxx" allocated to the mobile station UE is included in a radio resource allocation channel (L1/L2 control channel) transmitted from the radio base station eNB, before the predetermined timer (inactivity timer) expires, and to start discontinuous reception of a signal transmitted from the radio base station eNB when the predetermined timer (inactivity timer) expires, wherein, when the radio resource allocation channel (L1/L2 control channel) transmitted from the radio base station eNB satisfies a specific condition, the mobile station UE is configured not to reactivate the predetermined timer (inactivity timer), even though the mobile station UE detects that the mobile station identifier "xxx" allocated to the mobile station UE is included in the radio resource allocation channel (L1/L2 control channel) transmitted from the radio base station, before the predetermined timer (inactivity timer) expires.

In the second aspect, the radio resource allocation channel (L1/L2 control channel) transmitted from the radio base station eNB can be determined to satisfy the specific condition, when the radio resource allocation channel (L1/L2 control channel) is allocating a radio resource valid for a longer time than a minimum time unit (one sub-frame) in which a radio resource can be allocated, as a downlink radio resource for the mobile station UE.

In the second aspect, HARQ control can be performed between the radio base station eNB and the mobile station UE; the radio base station eNB can be configured to allocate a downlink radio resource to the mobile station UE by using the radio resource allocation channel (L1/L2 control channel), and to transmit downlink data by using the downlink radio resource; and the radio resource allocation channel (L1/L2 control channel) transmitted from the radio base station eNB can be determined to satisfy the specific condition, when the radio resource allocation channel (L1/L2 control channel) is allocating a downlink radio resource for retransmitting the downlink data to the mobile station UE under the HARQ control.

In the second aspect, the radio base station eNB can be configured to allocate a radio resource valid for a longer time than a minimum time unit (one sub-frame) in which a radio resource can be allocated, as a downlink radio resource for the mobile station UE by using the radio resource allocation channel (L1/L2 control channel), and to transmit downlink data by using the downlink radio resource; and the radio resource allocation channel (L1/L2 control channel) transmitted from the radio base station eNB can be determined to satisfy the specific condition, when the radio resource allocation channel (L1/L2 control channel) is a channel (L1/L2 control channel—persistent HARQ retransmission) for allocating a downlink radio resource for retransmitting the downlink data to the mobile station UE under the HARQ control.

A third aspect of the present embodiment is summarized as a mobile station used in a mobile communication system configured to allow the mobile station UE to start continuous reception of a signal transmitted from a radio base station eNB when the mobile station UE performing discontinuous reception of a signal transmitted from the radio base station eNB detects that a mobile station identifier "xxx" allocated to the mobile station UE is included in a radio resource allocation channel (L1/L2 control channel) transmitted from the radio base station eNB at a discontinuous reception timing (for example, the "On duration"), wherein, when the radio resource allocation channel (L1/L2 control channel) transmitted from the radio base station eNB at the discontinuous reception timing (for example, the "On duration") satisfies a specific condition, the mobile station UE is configured not to start the continuous reception of a signal transmitted from the radio base station eNB, but to continue the discontinuous reception of a signal transmitted from the radio base station eNB, even though the mobile station UE is performing the discontinuous reception of a signal transmitted from the radio base station eNB.

In the third aspect, the mobile station UE can be configured to perform HARQ control with the radio base station eNB; and the radio resource allocation channel (L1/L2 control channel) transmitted from the radio base station eNB can be determined to satisfy the specific condition, when the radio resource allocation channel (L1/L2 control channel) is allocating a downlink radio resource for retransmitting downlink data under the HARQ control, the downlink data having been transmitted to the mobile station UE by the radio base station eNB.

A fourth aspect of the present embodiment is summarized as a mobile station used in a mobile communication system configured to allow the mobile station UE to reactivate a predetermined timer (inactivity timer) when the mobile station UE performing continuous reception of a signal transmitted from a radio base station eNB detects that a mobile station identifier "xxx" allocated to the mobile station UE is included in a radio resource allocation channel (L1/L2 control channel) transmitted from the radio base station eNB, before the predetermined timer (inactivity timer) expires, and to start discontinuous reception of a signal transmitted from the radio base station eNB when the predetermined timer (inactivity timer) expires, wherein, when the radio resource allocation channel (L1/L2 control channel) transmitted from the radio base station eNB satisfies a specific condition, the mobile station UE is configured not to reactivate the predetermined timer (inactivity timer), even though the mobile station UE detects that the mobile station identifier "xxx" allocated to the mobile station UE is included in the radio resource allocation channel (L1/L2 control channel) transmitted from the radio base station eNB, before the predetermined timer (inactivity timer) expires.

In the fourth aspect, the mobile station UE can be configured to perform HARQ control with the radio base station eNB; and the radio resource allocation channel (L1/L2 control channel) transmitted from the radio base station eNB can be determined to satisfy the specific condition, when the radio resource allocation channel (L1/L2 control channel) is allocating a downlink radio resource for retransmitting downlink data under the HARQ control, the downlink data having been transmitted to the mobile station UE by the radio base station eNB.

Note that the above-described operations of the mobile station UE and radio base station eNB may be implemented by hardware, software modules executed by a processor, or a combination of the hardware and the software modules.

Each software module may be provided in a storage medium of any form, such as a random access memory (RAM), a flash memory, a read only memory (ROM), an erasable programmable ROM (EPROM), an electronically erasable and programmable ROM (EEPROM), a register, a hard disk, a removable disk or a CD-ROM.

The storage medium is connected to a processor so that the processor can read or write information from or into the storage medium. Alternatively, the storage medium may be integrated in a processor. Further, the storage medium and the processor may be provided in an ASIC, and the ASIC may be provided in the mobile station UE and the radio base station eNB. Alternatively, the storage medium and the processor may be provided as discrete components in the mobile station UE and the radio base station eNB.

While the present invention has been described in detail above by using the foregoing embodiment, it is apparent to those skilled in the art that the present invention is not limited to the embodiment described herein. The present invention may be practiced in the form of modifications and variations without departing from the gist and scope of the present invention as defined in the description of the scope of claims. It is to be therefore understood that the description herein is for the purpose of illustration only and is not intended to limit the present invention.

The invention claimed is:

1. A mobile communication system configured to allow a mobile station to start continuous reception of a signal transmitted from a radio base station when the mobile station performing discontinuous reception of a signal transmitted from the radio base station detects that a mobile station identifier allocated to the mobile station is included in a radio resource allocation channel transmitted from the radio base station at a discontinuous reception timing, wherein
    when the radio resource allocation channel transmitted from the radio base station at the discontinuous reception timing satisfies a specific condition, the mobile station is configured not to start the continuous reception of a signal transmitted from the radio base station, but to continue the discontinuous reception of a signal transmitted from the radio base station, even though the mobile station is performing the discontinuous reception of a signal transmitted from the radio base station.

2. The mobile communication system according to claim 1, wherein
    the radio resource allocation channel transmitted from the radio base station at the discontinuous reception timing is determined to satisfy the specific condition, when the radio resource allocation channel is allocating a radio resource valid for a longer time than a minimum time unit in which a radio resource can be allocated, as a downlink radio resource for the mobile station.

3. The mobile communication system according to claim 1, wherein
    HARQ control is performed between the radio base station and the mobile station;
    the radio base station is configured to allocate a downlink radio resource to the mobile station by using the radio resource allocation channel, and to transmit downlink data by using the downlink radio resource; and the radio resource allocation channel transmitted from the radio base station is determined to satisfy the specific condition, when the radio resource allocation channel is allocating a downlink radio resource for retransmitting the downlink data to the mobile station under the HARQ control.

4. The mobile communication system according to claim 3, wherein
the radio base station is configured to allocate a radio resource valid for a longer time than a minimum time unit in which a radio resource can be allocated, as a downlink radio resource for the mobile station by using the radio resource allocation channel, and to transmit downlink data by using the downlink radio resource; and
the radio resource allocation channel transmitted from the radio base station at the discontinuous reception timing is determined to satisfy the specific condition, when the radio resource allocation channel is allocating a downlink radio resource for retransmitting the downlink data to the mobile station under the HARQ control.

5. A mobile communication system configured to allow a mobile station to reactivate a predetermined timer when the mobile station performing continuous reception of a signal transmitted from a radio base station detects that a mobile station identifier allocated to the mobile station is included in a radio resource allocation channel transmitted from the radio base station, before the predetermined timer expires, and to start discontinuous reception of a signal transmitted from the radio base station when the predetermined timer expires, wherein
when the radio resource allocation channel transmitted from the radio base station satisfies a specific condition, the mobile station is configured not to reactivate the predetermined timer, even though the mobile station detects that the mobile station identifier allocated to the mobile station is included in the radio resource allocation channel transmitted from the radio base station, before the predetermined timer expires.

6. The mobile communication system according to claim 5, wherein
the radio resource allocation channel transmitted from the radio base station is determined to satisfy the specific condition, when the radio resource allocation channel is allocating a radio resource valid for a longer time than a minimum time unit in which a radio resource can be allocated, as a downlink radio resource for the mobile station.

7. The mobile communication system according to claim 5, wherein
HARQ control is performed between the radio base station and the mobile station;
the radio base station is configured to allocate a downlink radio resource to the mobile station by using the radio resource allocation channel, and to transmit downlink data by using the downlink radio resource; and
the radio resource allocation channel transmitted from the radio base station is determined to satisfy the specific condition, when the radio resource allocation channel is allocating a downlink radio resource for retransmitting the downlink data to the mobile station under the HARQ control.

8. The mobile communication system according to claim 7, wherein
the radio base station is configured to allocate a radio resource valid for a longer time than a minimum time unit in which a radio resource can be allocated, as a downlink radio resource for the mobile station by using the radio resource allocation channel, and to transmit downlink data by using the downlink radio resource; and
the radio resource allocation channel transmitted from the radio base station is determined to satisfy the specific condition, when the radio resource allocation channel is allocating a downlink radio resource for retransmitting the downlink data to the mobile station under the HARQ control.

9. A mobile station used in a mobile communication system configured to allow the mobile station to start continuous reception of a signal transmitted from a radio base station when the mobile station performing discontinuous reception of a signal transmitted from the radio base station detects that a mobile station identifier allocated to the mobile station is included in a radio resource allocation channel transmitted from the radio base station at a discontinuous reception timing, wherein
when the radio resource allocation channel transmitted from the radio base station at the discontinuous reception timing satisfies a specific condition, the mobile station is configured not to start the continuous reception of a signal transmitted from the radio base station, but to continue the discontinuous reception of a signal transmitted from the radio base station, even though the mobile station is performing the discontinuous reception of a signal transmitted from the radio base station.

10. The mobile station according to claim 9, wherein
the mobile station is configured to perform HARQ control with the radio base station; and
the radio resource allocation channel transmitted from the radio base station is determined to satisfy the specific condition, when the radio resource allocation channel is allocating a downlink radio resource for retransmitting downlink data under the HARQ control, the downlink data having been transmitted to the mobile station by the radio base station.

11. A mobile station used in a mobile communication system configured to allow the mobile station to reactivate a predetermined timer when the mobile station performing continuous reception of a signal transmitted from a radio base station detects that a mobile station identifier allocated to the mobile station is included in a radio resource allocation channel transmitted from the radio base station, before the predetermined timer expires, and to start discontinuous reception of a signal transmitted from the radio base station when the predetermined timer expires, wherein
when the radio resource allocation channel transmitted from the radio base station satisfies a specific condition, the mobile station is configured not to reactivate the predetermined timer, even though the mobile station detects that the mobile station identifier allocated to the mobile station is included in the radio resource allocation channel transmitted from the radio base station, before the predetermined timer expires.

12. The mobile station according to claim 11, wherein
the mobile station is configured to perform HARQ control with the radio base station; and
the radio resource allocation channel transmitted from the radio base station is determined to satisfy the specific condition, when the radio resource allocation channel is allocating a downlink radio resource for retransmitting downlink data under the HARQ control, the downlink data having been transmitted to the mobile station by the radio base station.

* * * * *